United States Patent [19]
Kazmark

[11] Patent Number: 4,630,837
[45] Date of Patent: Dec. 23, 1986

[54] TWO-WHEELED CART WITH AUXILIARY WHEEL

[76] Inventor: Eugene A. Kazmark, 5 Remin La., Joliet, Ill. 60433

[21] Appl. No.: 620,753

[22] Filed: Jun. 14, 1984

Related U.S. Application Data

[63] Continuation-in-part of Ser. No. 507,764, Jun. 27, 1983, abandoned.

[51] Int. Cl.⁴ .............................................. B62B 1/04
[52] U.S. Cl. .................................. 280/47.2; 280/655; 280/47.29
[58] Field of Search ................. 280/47.2, 47.24, 47.29, 280/641, 654, 655, 43.1, 47.12, 47.21, 5.32; 182/20, 127

[56] References Cited

U.S. PATENT DOCUMENTS

| | | | |
|---|---|---|---|
| 1,965,944 | 7/1934 | Lea | 280/47.29 |
| 2,243,915 | 6/1941 | Mueller | 280/47.2 |
| 2,612,386 | 9/1952 | Schutzer | 280/641 |
| 2,761,690 | 9/1956 | Bradley | 280/47.2 |
| 3,064,990 | 11/1962 | Salvucci | 280/47.2 |
| 3,655,212 | 4/1972 | Krass | 280/47.2 |
| 4,009,891 | 3/1977 | Jensen | 280/47.2 |
| 4,175,769 | 11/1979 | Kazmark | 280/654 |
| 4,284,286 | 8/1981 | Lewallen | 280/47.2 |
| 4,492,388 | 1/1985 | de Wit | 280/DIG. 4 |

FOREIGN PATENT DOCUMENTS 2230708  1/1974  Fed. Rep. of Germany ..... 280/47.2

Primary Examiner—David M. Mitchell

[57] ABSTRACT

A two-wheeled cart for transporting articles such as luggage and the like is equipped with an auxiliary wheel which is movable between a storage position and a use position in which the cart is self-supporting. The cart includes a base portion and a handle portion, and the base portion includes a pair of parallel tubes and an axle which extends between the tubes and supports a pair of wheels. The auxiliary wheel is mounted on an auxiliary wheel frame which is movably mounted on the base portion for movement between a storage position in which the wheel frame extends generally parallel to the parallel tubes and a use position in which the auxiliary wheel supports the handle portion at an acute angle with respect to the supporting surface.

2 Claims, 18 Drawing Figures

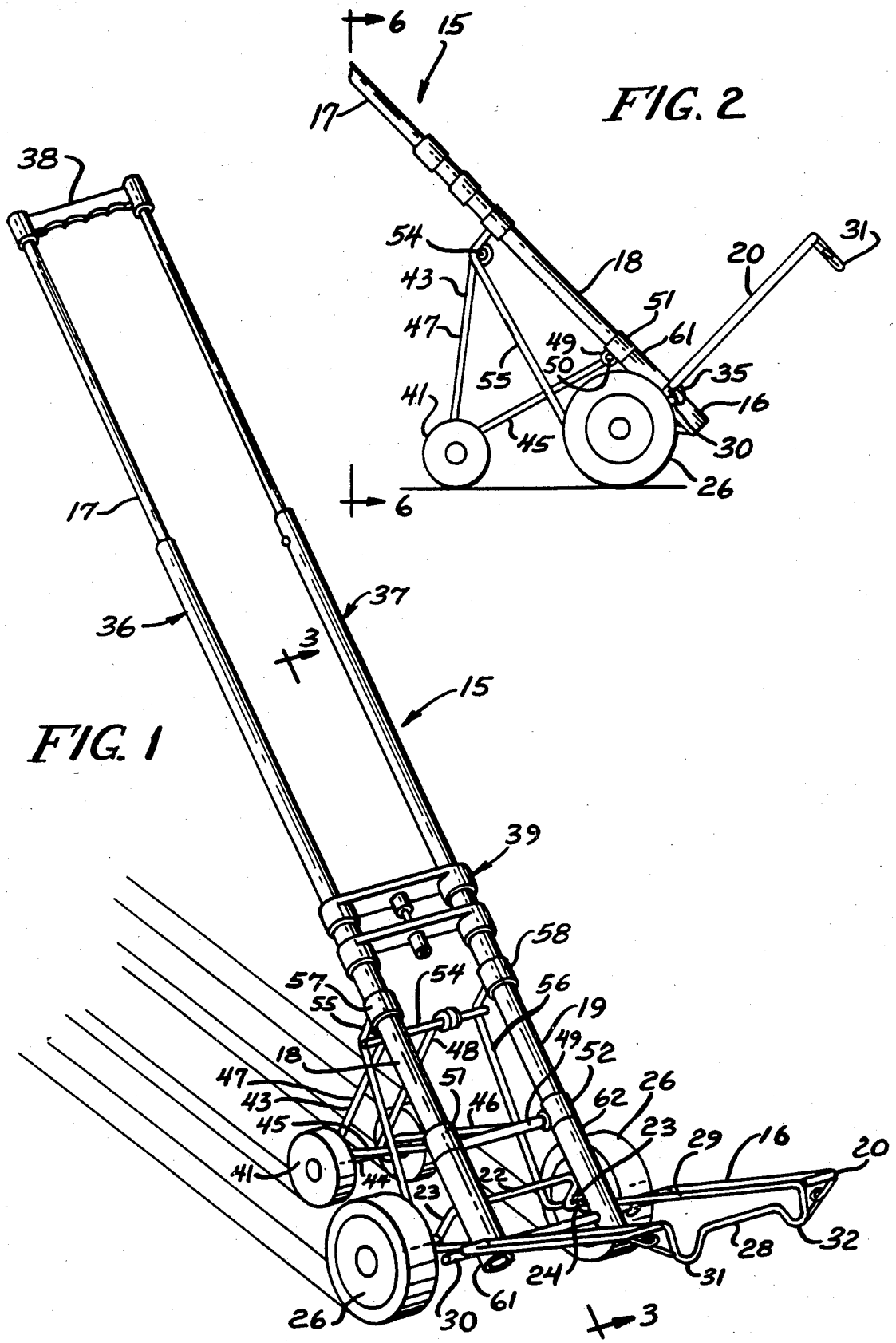

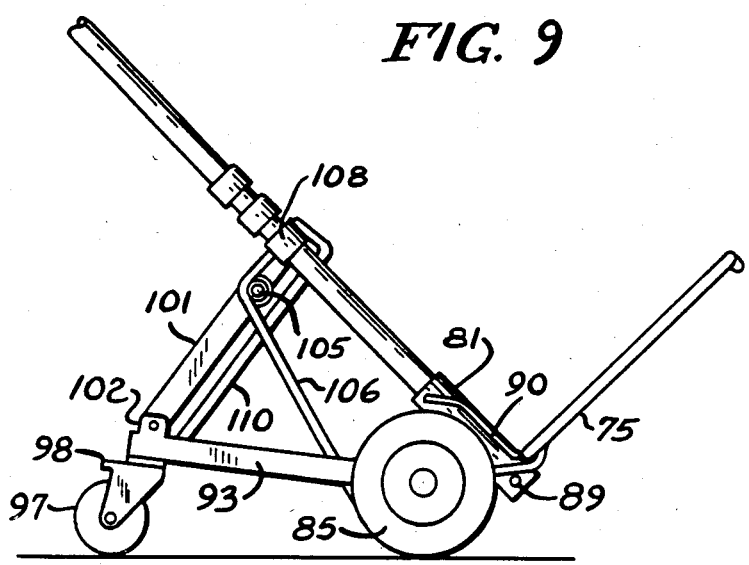
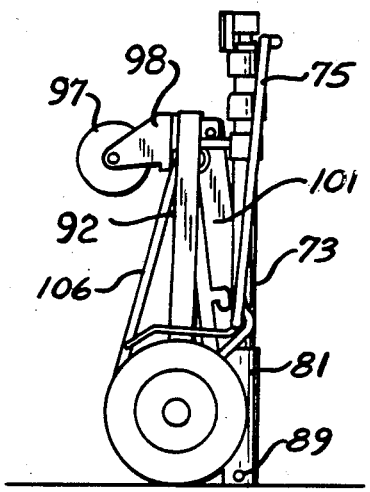
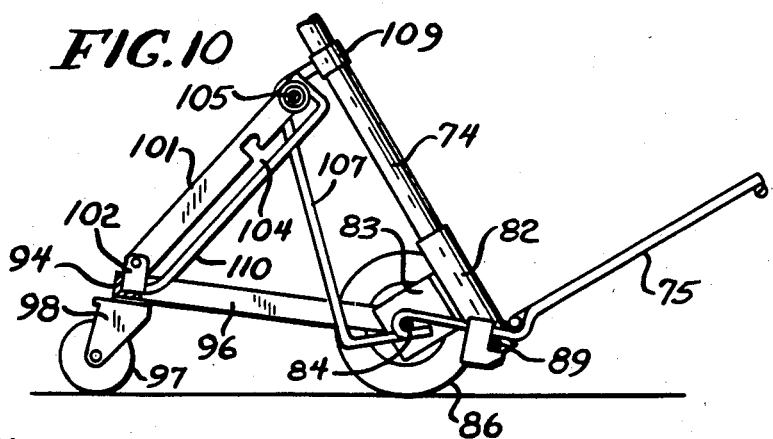
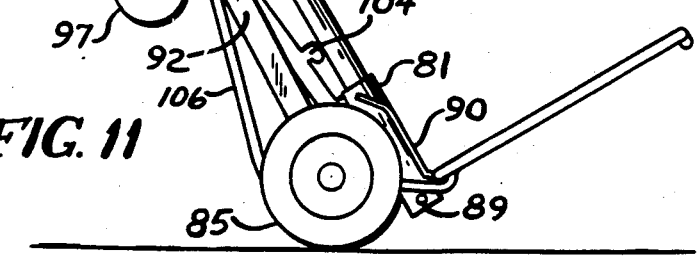

TWO-WHEELED CART WITH AUXILIARY WHEEL

RELATED APPLICATION

This application is a continuation-in-part of my co-pending application Ser. No. 507,764, filed June 27, 1983 and now abandoned.

BACKGROUND AND SUMMARY

This invention relates to carts such as luggage carriers, and, more particularly, to a two-wheeled cart which is equipped with an auxiliary wheel which makes the cart self-supporting.

Carts for transporting luggage and the like are becoming increasingly popular for transporting not only luggage but other heavy objects such as heavy brief cases, trunks, tool kits, sample cases, and the like. Such carts may be broadly referred to herein as luggage carts, although they are used for transporting many articles in addition to luggage.

Such carts are desirably lightweight and collapsible so that they can be carried and stored easily when not being used. Portable luggage carts of this type are described in my prior U.S. Pat. Nos. 3,612,563 and 3,998,476. Such carriers include a base portion having a pair of wheels and telescoping or collapsible handle portion. The handle may be telescoped or collapsed when the cart is not being used to facilitate carrying and storing the cart.

Conventional two-wheel carts are not self-supporting, and they must be supported by one hand as they are wheeled over a supporting surface. If a cart is carrying a heavy load, a substantial load must be supported by the hand and arm of the user. Further, the support provided by the two wheels might not be stable when the cart moves over curbs or the like, and the cart can tip over.

The invention provides a cart with an auxiliary wheel which can be moved between a storage position and a supporting position. When the auxiliary wheel is in the storage position, the cart can be used as a two-wheeled cart. When the auxiliary wheel is in the supporting position, the cart is supported on a three point stance and is self-supporting. Since all of the load carried by the cart is supported by the wheels, the user need exert only enough force to pull or push the cart.

DESCRIPTION OF THE DRAWING

The invention will be explained in conjunction with illustrative embodiments shown in the accompanying drawing, in which FIG. 1 is a perspective view of a cart which is equipped with a pair of auxiliary wheels in accordance with the invention;

FIG. 2 is a fragmentary side elevational view of the cart of FIG. 1;

FIG. 9 is a view similar to FIG. 8 showing the auxiliary wheel frame in an alternate position;

FIG. 10 is a fragmentary sectional view taken along the line 10—10 of FIG. 7 showing the auxiliary wheel frame in its FIG. 8 position;

FIG. 11 is a fragmentary side elevational view showing the auxiliary wheel frame in its storage position;

FIG. 12 is a fragmentary side elevational view showing both the auxiliary wheel frame and the rack in their storage position;

DESCRIPTION OF SPECIFIC EMBODIMENTS

Figure 3:
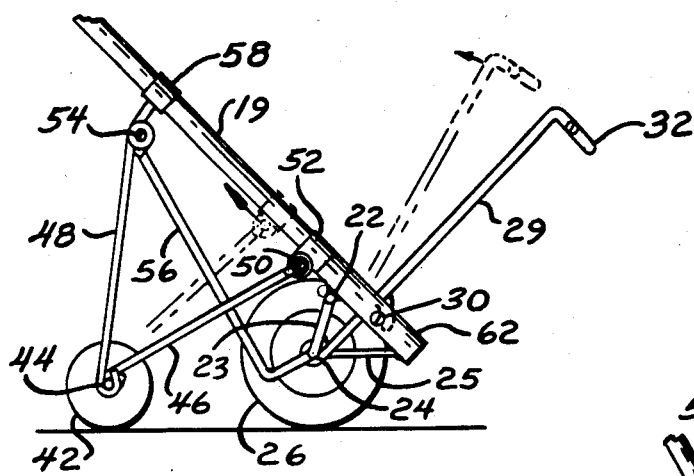
FIG. 3 is a fragmentary sectional view of the cart taken along the line 3—3 of FIG. 1.

Referring first to FIGS. 1 and 2, a cart 15 includes a base portion 16 and a handle portion 17. The base portion includes a pair of parallel tubes 18 and 19 and a wire rack 20 which extends generally perpendicularly from the parallel tubes in FIGS. 1 and 2 so that luggage and other articles can be supported by the rack and the parallel tubes. The cart is also generally provided with an elastic cord, not shown, which is attached to the rack and which can be hooked to the handle to hold the articles on the cart.

Figure 6:
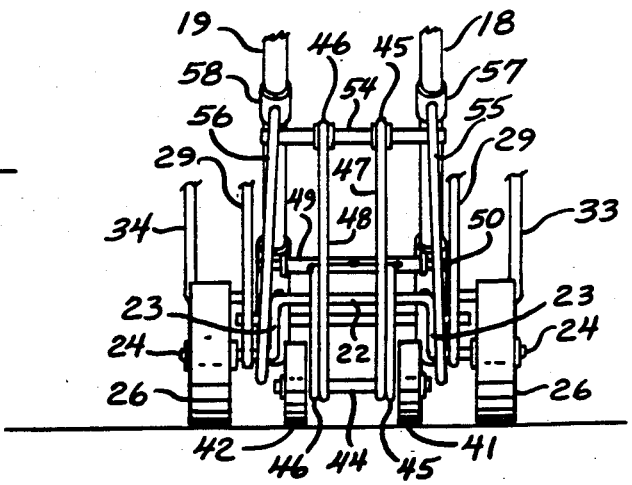
FIG. 6 is a rear elevational view taken along the line 6—6 of FIG. 2.

Referring to FIGS. 1, 3, and 6, an axle rod 22 is attached to each of the parallel tubes 18 and 19 and includes a pair of rearwardly extending portions 23 which terminate in laterally outwardly extending stub shaft portions 24. Brace rods 25 are attached to the parallel tubes 18 and 19 and to the stub shaft portions 24 to brace and support the stub shaft portions. A pair of main wheels 26 are rotatably mounted on the stub shaft portions 24 and the axle rod.

The wire rack 20 is formed from a generally U-shaped wire rod 28 having a pair of side portions 29 (FIG. 3), the ends of which are looped over the stub shaft portions 24 of the axle rod so that the rack is pivotally mounted on the axle rod. A rod 30 extends through the lower ends of the parallel tubes 18 and 19 and provides a pair of end portions which extend beyond the parallel tubes and which support the rack in its use position illustrated in FIGS. 1 and 2. The rod 28 is formed with a pair of U-shaped support portions 31 and 32 to support the cart when the handle extends vertically. A pair of outrigger wire rods 33 and 34 (see also FIG. 6) are attached to the rod 28 to extend the width of the rack.

The rack is pivotable about the axle rod 22 from its use position illustrated in FIGS. 1 and 2 to a storage position illustrated in FIG. 3 in which the side portions 29 extend generally parallel to the parallel tubes 18 and 19. The U-shaped support portions 31 and 32 are aligned with the parallel tubes and permit the side portions 29 to pivot rearwardly past the parallel tubes. A detent 35 (FIG. 2) is attached to each of the side portions 29 of the rack and is engageable with the wire rod 30 to maintain the rack in its use position until a sufficient pivoting force is applied to the rack to overcome the detenting force.

The handle portion 17 includes a pair of telescoping tube assemblies 36 and 37 which are telescopingly supported by the parallel tubes 18 and 19. A plastic hand grip 38 connects the upper ends of the tube assemblies.

The telescoping tube assemblies 36 and 37 are formed in accordance with U.S. Pat. No. 3,998,476. FIG. 1 illustrates the tube assemblies in their extended or use position. As described in the patent, the tube assemblies can be telescoped or collapsed by operating a release bar assembly 39 and pushing down on the hand grip 38.

A pair of auxiliary wheels 41 and 42 are supported by an auxiliary wheel frame 43. The auxiliary wheels support the cart as shown in FIG. 2 with the handle portion 17 and the rack 20 both extending at an angle of about 45° with respect to the supporting surface. The auxiliary wheels and the two main wheels 26 provide a three point stance which supports the cart in a stable, self-supporting manner. The entire load carried by the cart is supported by the auxiliary wheels and the main wheels, and the user does not have to support any of the load.

The auxiliary wheels 41 and 42 are mounted on an axle 44. The auxiliary wheel frame 43 includes a first pair of support rods 45 and 46 and a second pair of support rods 47 and 48 which extend upwardly from the axle 44. The lower end of each of the support rods 45 and 46 is looped over the axle 44, and the upper end of each of the rods is attached to a tubular sleeve 49 (see also FIG. 6). The sleeve 49 is mounted on a rod 50 (FIGS. 3 and 6) and is welded to two tubular sleeves 51 and 52 which are slidably mounted on the parallel tubes 18 and 19.

The lower end of each of the support rods 47 and 48 is looped over the axle 44 and can be welded thereto, and the upper end of each of the rods is looped over a rod 54 which extends generally perpendicularly to the parallel tubes 18 and 19. The ends of the rod 54 are welded to a pair of generally L-shaped rods 55 and 56 which are attached to sleeves 57 and 58, respectively, on the parallel tubes 18 and 19. The lower ends of the rods 55 and 56 are welded to the stub shaft portions 24 of the axle rod 22.

A pair of tubular sleeves 61 and 62 are ensleeved over the lower ends of the parallel tubes 18 and 19, and the upper end of each of the sleeves provides a stop shoulder 63 (FIG. 4) which limits downward sliding movement of the sleeves 51 and 52 toward the lower ends of the parallel tubes 18 and 19. Upward sliding movement of the sleeves 51 and 52 is limited by the sleeves 57 and 58 whose position is fixed by the L-shaped rods 55 and 56.

When the auxiliary wheel frame is in its use position illustrated in FIGS. 2 and 3, the sleeves 51 and 52 abut the sleeves 61 and 62, and the support rods 45 and 46 form an acute angle with respect to the parallel tubes 18 and 19. The support rods 45–48 and the parallel tubes 18 and 19 form a triangular structure which provides a stable support for the auxiliary wheels 41 and 42.

Figure 4:
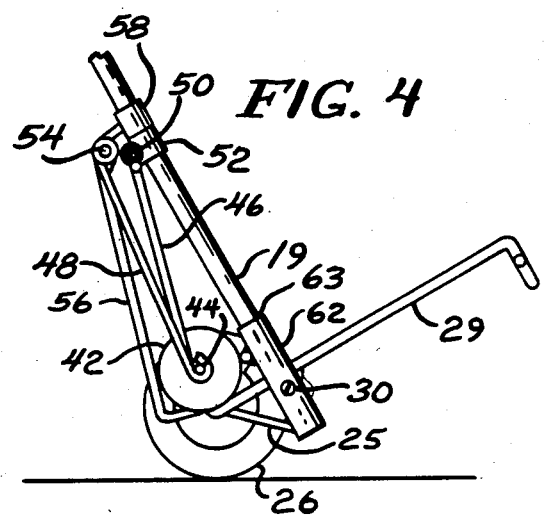
FIG. 4 is a sectional view similar to FIG. 3 showing the auxiliary wheel frame in its storage position.

The auxiliary wheel frame can be moved to its storage position by raising the rods 45 and 46 or the sleeve 49 to which the rods 45 and 46 are attached. This causes the sleeves 51 and 52 to slide upwardly on the parallel tubes 18 and 19 until they contact the sleeves 57 and 58 as shown in FIG. 4. When the rods 45 and 46 move past the perpendicular or centered position with respect to the parallel tubes 18 and 19 (illustrated in phantom in FIG. 3), the rods 45–48 and the auxiliary wheels 41 and 42 swing toward the parallel tubes 18 and 19. When the auxiliary wheels reach their storage position illustrated in FIGS. 4 and 5, the rods 45 and 48 extend almost parallel with the parallel tubes 18 and 19. The auxiliary wheels are positioned inside of the main wheels 26. When the auxiliary wheels are in their storage position, the cart can be used as a conventional two-wheeled cart without interference from the auxiliary wheels or the auxiliary wheel frame.

Figure 5:
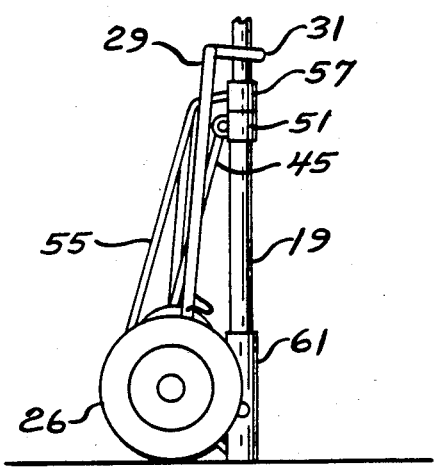
FIG. 5 is a fragmentary side elevational view showing both the auxiliary wheel frame and the rack in their storage positions.

FIG. 5 illustrates the cart with both the auxiliary wheels and the rack 20 in their storage position. The handle can be collapsed as described in U.S. Pat. No. 3,998,476. The cart can then be carried or stored in a compact configuration.

Although the cart 15 is provided with a pair of auxiliary wheels, it will be understood that a single auxiliary wheel can also be used.

FIGS. 7–11 illustrate another embodiment of cart 70 which has a single auxiliary wheel. The cart includes a base portion 71 and a handle portion 72. The base portion includes parallel tubes 73 and 74 similar to the parallel tubes previously described and a rack 75. The handle portion includes telescoping tube assemblies 76 and 77, a hand grip 78, and a release bar assembly 79 as previously described.

A pair of tubular sleeves 81 and 82 are mounted on the ends of the parallel tubes 73 and 74. An axle mounting plate 83 (FIG. 10) is welded to each of the sleeves 81 and 82, and a main axle 84 extends through the two axle mounting plates. A pair of main wheels 85 and 86 are rotatably mounted on the main axle.

The rack 75 includes a generally U-shaped outer wire rod 87 and three fore-and-aft wire rods 88 which are welded to the front portion of the outer rod 87. The rear ends of the fore-and-aft rods 88 are looped over the axle 84. The middle rod 88 is positioned between the parallel tubes 73 and 74, and the other two rods 88 are positioned outwardly of the parallel tubes. A rod 89 extends through the lower ends of the parallel tubes 73 and 74 and engages the rods 88 to support the rack in its use position illustrated in FIGS. 7–11. A pair of mud guards 90 are welded to the outer rod 87 of the rack and prevent mud and water from being thrown from the wheels against the article being carried by the cart.

Figure 8:
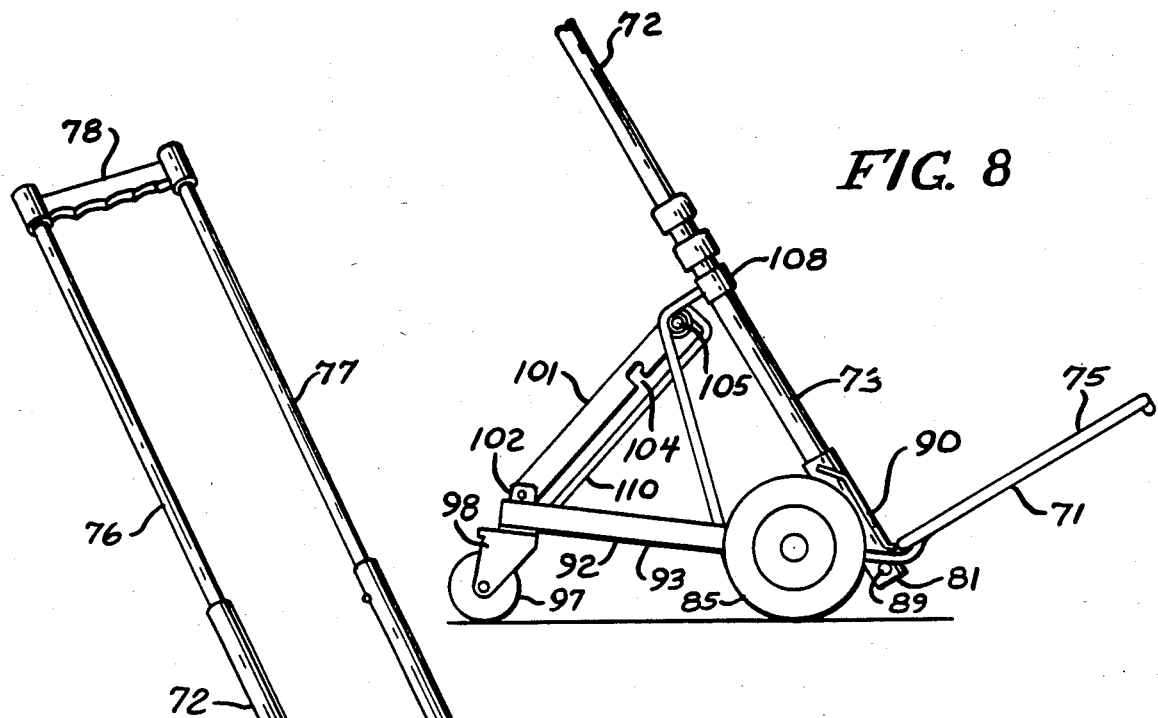
FIG. 8 is a fragmentary side elevational view of the cart of FIG. 7.
Figure 7:
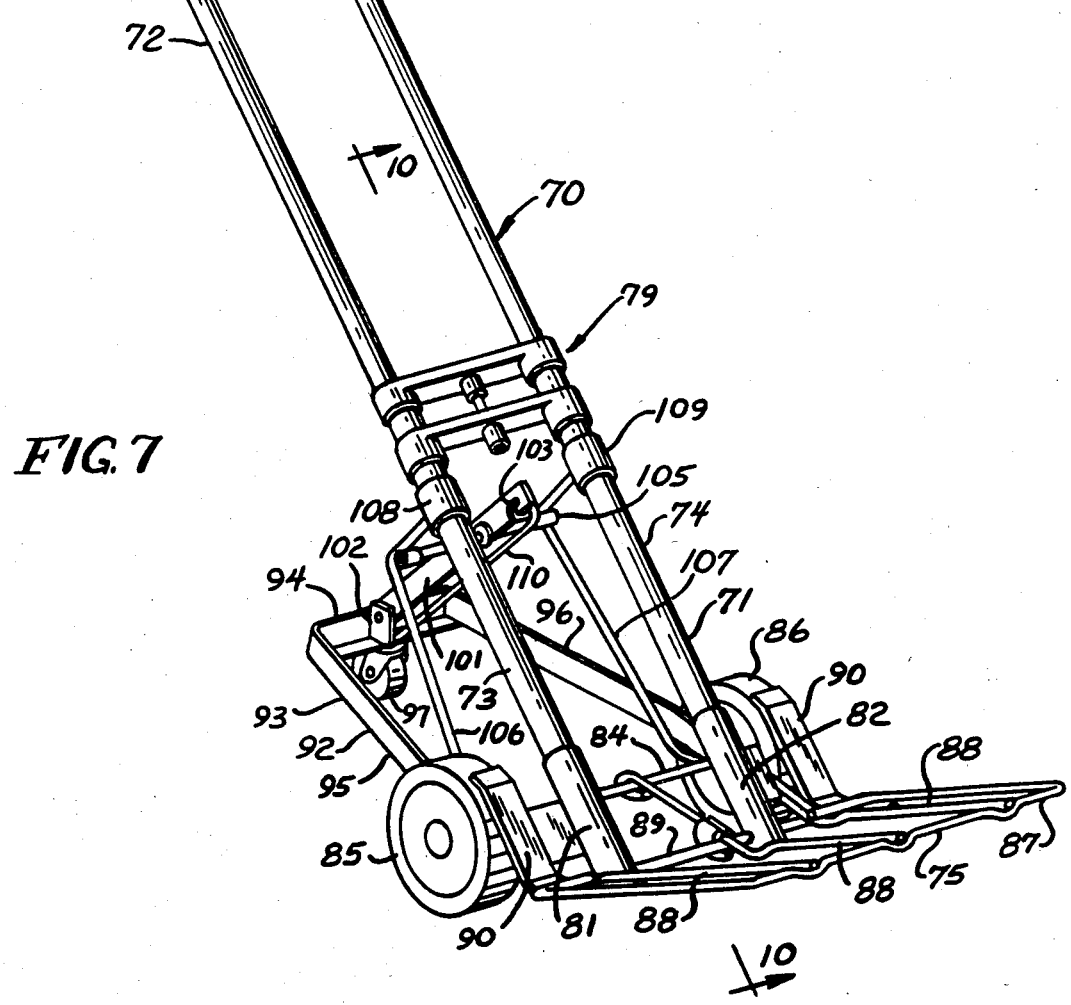
FIG. 7 is a perspective view of another embodiment of a cart which is equipped with an auxiliary wheel in accordance with the invention.

An auxiliary wheel frame 92 is pivotally mounted on the base portion of the cart for movement between a pair of use positions illustrated in FIGS. 8 and 9 and a storage position illustrated in FIGS. 11 and 12. The wheel frame 92 includes a generally U-shaped bar 93 which includes a middle portion 94 and a pair of straight side portions 95 and 96. The forward end of each of the side portions 95 and 96 is provided with an opening through which the axle 84 extends so that the bar is pivotally mounted on the axle. An auxiliary wheel 97 is pivotally mounted on the mid portion 94 of the bar 93 by a caster mounting bracket 98.

A support bar 101 is pivotally attached to the mid portion 94 of the bar 93 by a clevis 102. The other end of the support bar is provided with a pair of L-shaped notches 103 and 104. The notches are engageable with a rod 105 which is supported by a pair of L-shaped rods 106 and 107. The upper ends of the rods 106 and 107 are welded to sleeves 108 and 109 on the parallel tubes 73 and 74, and the lower end of the rods 106 and 107 are welded to the axle 84. The support bar 101 is prevented from pivoting away from the rod 105 by a retaining rod 110 which is connected to the ends of the support bar.

The auxiliary wheel frame is supported in either of two use positions illustrated in FIGS. 8 and 9 by inserting the rod 105 into one of the notches 103 and 104 in the support bar 101. In both positions the handle portion of the cart is maintained at an acute angle with respect to the supporting surface, and the cart is self-supporting. The included angle between the handle and the supporting surface is less when the rod is in the second notch 104 as illustrated in FIG. 9.

The auxiliary wheel frame can be moved to its storage position illustrated in FIGS. 11 and 12 merely by lifting the support bar 101 so that the rod 105 is withdrawn from the notch in the bar and pivoting the auxiliary wheel frame upwardly. The suport bar 101 simultaneously pivots downwardly, and the auxiliary wheel frame and the support bar 101 extend generally parallel to the parallel tubes 73 and 74 when the wheel frame is in its storage position.

The rack 75 can be moved to its storage position illustrated in FIG. 12 by pivoting the rack upwardly about its pivotal connection with the axle 84.

FIGS. 13-18 illustrate still another embodiment of a cart with an auxiliary wheel frame. The cart 115 includes a base portion 116 and a handle portion 117. The base portion includes parallel tubes 118 and 119 and a rack 120. The handle portion includes telescoping tube assemblies 121 and 122 and a release bar assembly 123 as previously described.

A pair of tubular sleeves 125 and 126 are mounted on the ends of the parallel tubes 118 and 119, and an axle rod 127 is attached to each of the sleeves 125 and 126. The axle rod 127 is similar to the axle rod 22 shown in FIGS. 1, 3, and 6 and includes a pair of rearwardly extending portions 128 which terminate in laterally outwardly extending stub shaft portions. Brace rods 130 (FIG. 16) are attached to the sleeves 125 and 126 and to the stub shaft portions for reinforcing the stub shaft portions. A pair of main wheels 131 are rotatably mounted on the stub shaft portions.

A pair of generally L-shaped rods 133 and 134 are attached to a pair of sleeves 135 and 136 on the parallel tubes 118 and 119, and the lower ends of the rods 133 and 134 are welded to the stub shaft portions of the axle rod 127.

The rack 120 is similar to the rack 20 of FIGS. 1-6 and is pivotally mounted on the axle rod in the same way. A rod 137 extends through the parallel tubes 118 and 119 and supports the rack in its use position illustrated in FIGS. 13 and 14. The rack 120 is pivotable to its storage position illustrated in FIG. 18 in the same way as the rack 20.

Figure 13:
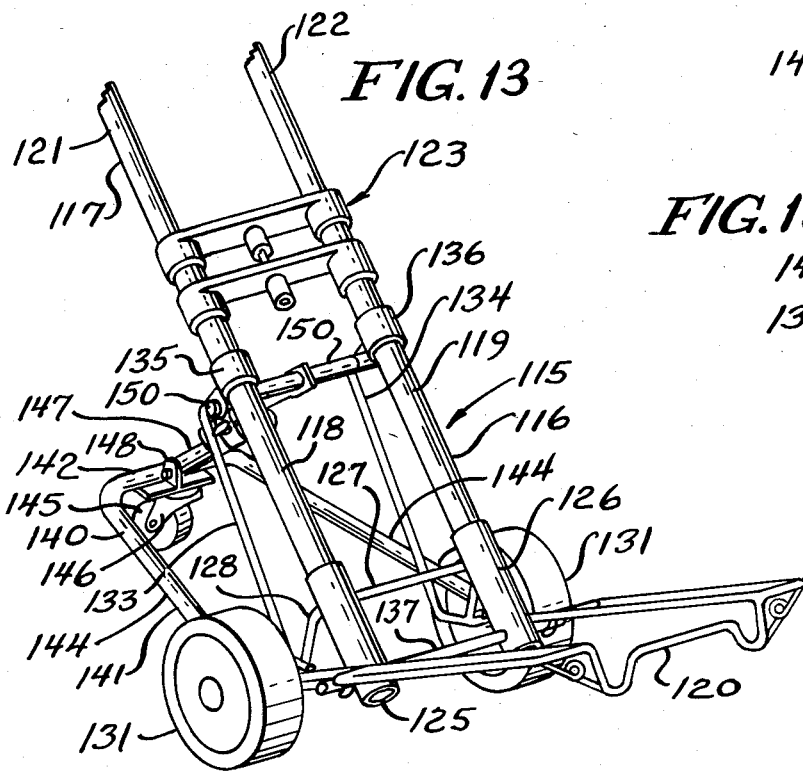
FIG. 13 is a perspective view of another embodiment of a cart which is equipped with an auxiliary wheel in accordance with the invention.
Figure 18:
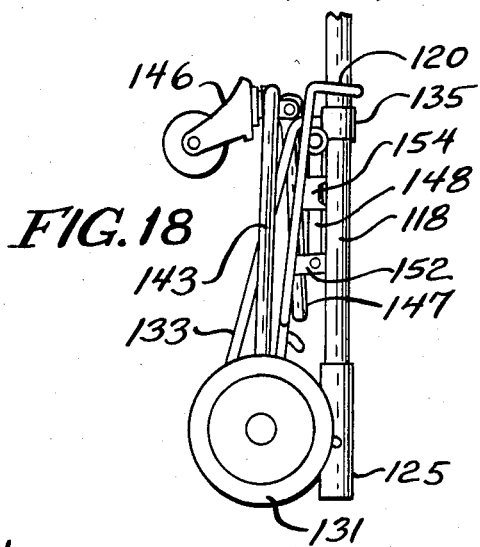
FIG. 18 is a side view showing both the auxiliary wheel frame and the rack in their storage position.
Figure 14:
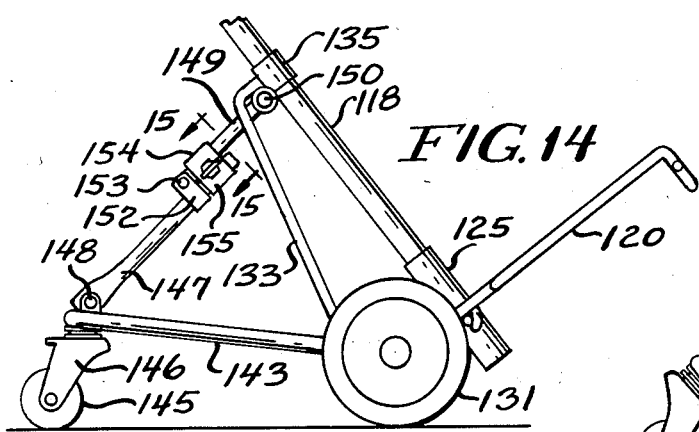
FIG. 14 is a fragmentary side elevational view of the cart of FIG. 13.
Figure 15:
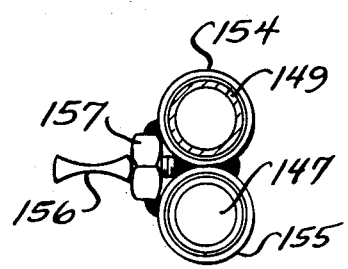
FIG. 15 is a sectional view taken along the line 15—15 of FIG. 14.
Figure 17:
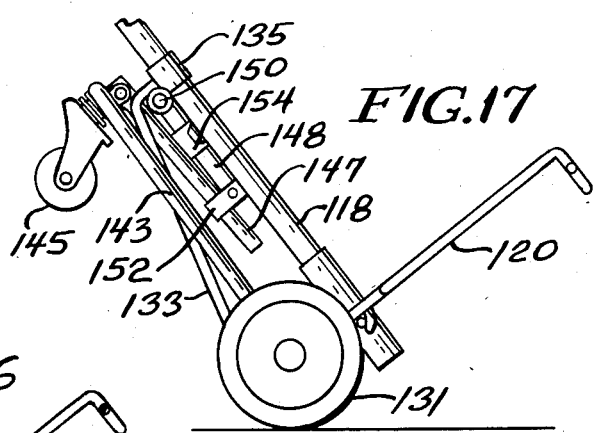
FIG. 17 is a side view showing the auxiliary wheel frame in its storage position.

An auxiliary wheel frame 140 is pivotally mounted on the base portion of the cart for movement between a use position illustrated in FIGS. 13 and 14 and a storage position illustrated in FIG. 18. The wheel frame includes a generally U-shaped bar 141 which includes a middle portion 142 and a pair of straight side portions 143 and 144. The forward end of each of the side portions is provided with an opening through which the stub shaft portions of the axle rod 127 extend. An auxiliary wheel 145 is pivotally mounted on the mid-portion 142 of the bar 141 by caster 146.

A lower support rod 147 is pivotally attached to the mid portion 142 of the bar 141 by a bracket 148, and an upper support rod 149 is pivotally mounted on a rod 150 which extends between and is secured to the L-shaped rods 133 and 134. A pair of sleeves 151 are mounted on the rod 150 on each side of the rod 148 to center the rod. A clevis 152 is secured to the lower support rod 147, and the upper support rod is pivotally secured to the clevis by a pin 153.

When the auxiliary wheel frame is in its use position illustrated in FIG. 13, the upper and lower support rods are locked in parallel position by a pair of locking sleeves 154 and 155 which are welded together. A thumbscrew 156 (FIG. 15) is threaded into a bolt 157 which is welded to the sleeves and provides a finger grip for moving the sleeves. The sleeve 154 is slidably mounted on the upper support rod 149, and the lower support rod 147 is locked in parallel position by the sleeve 155 which slides over the upper end of the lower support rod.

Figure 16:
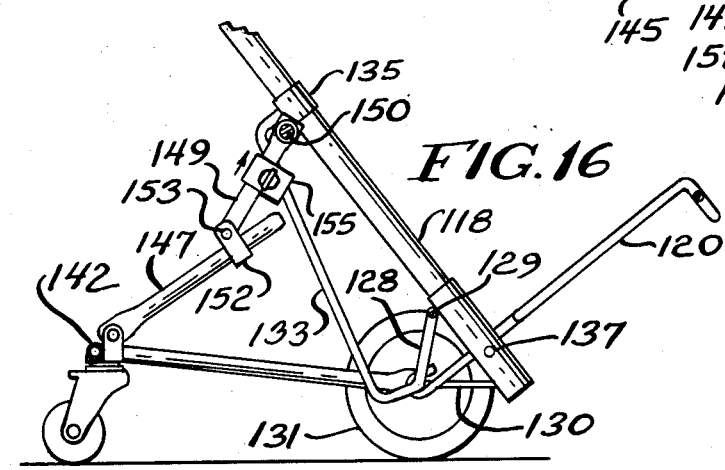
FIG. 16 is a side view similar to FIG. 14 showing the process of pivoting the auxiliary wheel frame to its storage position.

When the locking sleeves 154 and 155 are moved beyond the end of the lower support rod 147 as shown in FIG. 16, the upper and lower support rods 147 and 148 are free to pivot about the pivot connection provided by the clevis 152. The auxiliary wheel frame can then pivot about the axle rod 147 to the storage position illustrated in FIG. 17 in which the auxiliary wheel frame extends generally parallel to the parallel tubes 118 and 119. The rack 120 can be moved to its storage position by pivoting the rack upwardly about its pivotal connections with the axle rod.

If desired, the position of the clevis 152 and locking sleeves 154 and 155 can be reversed so that the locking sleeves are slidably mounted on the lower support rod.

In the embodiments illustrated in FIGS. 7-18 the auxiliary wheel frame is supported in its use position by a support arm which is pivotally connected to the auxiliary wheel frame and by means for locking the support arm relative to the base portion of the cart. It will be understood, however, that the support arm could also be pivotally attached to the base portion and removably attachable to the auxiliary wheel frame.

While in the foregoing specification a detailed description of specific embodiments of the invention were set forth for the purpose of illustration, it will be understood that many of the details herein given may be varied considerably by those skilled in the art without departing from the spirit and scope of the invention.

I claim:

1. A cart for transporting articles such as luggage and the like comprising a base portion for supporting an article to be transported, a handle portion extending upwardly from the base portion, an axle mounted on the base portion, a pair of wheels mounted on the axle, an auxiliary wheel frame movably mounted on the cart for movement between a storage position and a supporting position, and an auxiliary wheel mounted on the auxiliary wheel frame, the auxiliary wheel supporting the handle portion at an acute angle with respect to a supporting surface when the auxiliary wheel frame is in its support position whereby the cart is self-supporting, said auxiliary wheel frame including a generally U-shaped rod which is connected to the base portion for pivotal movement with respect to the base portion, a first support arm which is pivotally attached to the U-shaped rod, a second support arm which is pivotally attached to the base portion, pivot means mounted on one of the support arms for pivotally attaching said one support arm to the other support arm, the first and second support arms being movable between a first portion in which they support the auxiliary wheel frame in its support position and a second position in which the auxiliary wheel frame can move to its storage position, and means for releasably locking the first and second support arms in their first position, the base portion including a pair of parallel tubes, said axle extending between and being connected to said parallel tubes, said U-shaped rod being pivotally connected to said axle, a generally L-shaped rod attached to each of the parallel tubes and to the axle, a rod extending generally perpendicularly to the parallel tubes and being connected to said L-shaped rods, said second support arm being pivotally connected to said perpendicularly extending rod.

2. The cart of claim 1 in which the base portion includes a rack pivotally connected to the axle and pivotable between a supporting position in which the rack extends generally perpendicularly from the parallel tubes for supporting an article to be transported and a storage position in which the rack extends generally parallel to the parallel tubes.

* * * * *